Figure 1:
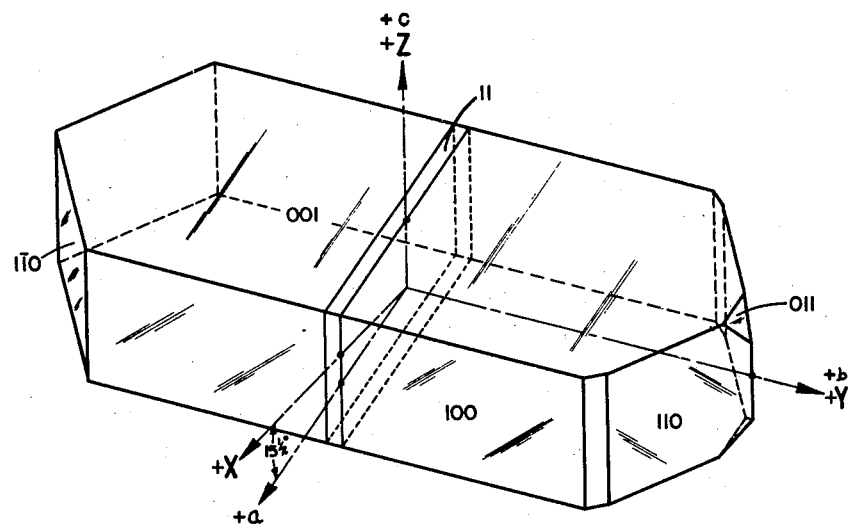

Jan. 3, 1950     H. JAFFE     2,493,144

PIEZOELECTRIC CRYSTAL PLATE

Filed April 29, 1948

*INVENTOR.*
HANS JAFFE

BY Harries A. Mumma Jr.

ATTORNEY

Patented Jan. 3, 1950

2,493,144

UNITED STATES PATENT OFFICE 2,493,144

PIEZOELECTRIC CRYSTAL PLATE

Hans Jaffe, Cleveland, Ohio, assignor to The Brush Development Company, Cleveland, Ohio, a corporation of Ohio Application April 29, 1948, Serial No. 23,904

3 Claims. (Cl. 171—327)

This invention relates to an improved piezoelectric crystal plate, and more particularly to a piezoelectric element in the form of a plate or bar cut from a single crystal of the substance ethylenediamine tartrate, $C_6H_{14}N_2O_6$.

Crystalline ethylenediamine tartrate is known to be of the sphenoidal class of the monoclinic system, also known as class $C_2$. Monoclinic crystals have two crystallographic axes, usually designated $a$ and $c$, not at right angles to each other, and a third crystallographic axis $b$ in a direction normal to the plane defined by the axes $a$ and $c$. It is conventional to relate these axes to a system of rectangular coordinates, with the positive directions along the coordinate axes chosen to provide a right-handed system of coordinates. When two of these coordinate axes are chosen so that they coincide in direction and sense with the crystallographic axes $b$ and $c$, these two axes conventionally are identified as the Y- and Z-axes respectively. The crystallographic axis $a$ then is found to be rotated from the coordinate X-axis in the XZ-plane by a counterclockwise or positive angle of approximately 15.5° for the ethylenediamine tartrate crystal.

Crystals of this type have piezoelectric properties described by eight independent piezoelectric coefficients. Several useful cuts having specific crystallographic orientations are known, the piezoelectric action of these cuts being related to one or more of these coefficients. All these known cuts of ethylenediamine tartrate except one are of the lateral expander type, that is, the useful mechanical stress or strain is of an expansive or contractive nature and in a direction perpendicular to the effective electric field. The only useful cut not of this type now known in the art is of a type utilizing a thickness-shear mode of motion of the crystal plate, wherein the stress or strain occurs in a plane parallel to the electric field.

Values have been published for the piezoelectric coefficients $d_{21}$, $d_{23}$, and $d_{25}$ for ethylenediamine tartrate. Using conventional notation, these coefficients represent for a Y-cut plate the sides of which extend in the X and Z directions the relationship between electrical charge density developed and stress applied when the charge is associated with an electrical field or electrical displacement in the Y direction and the stress is respectively an expansive stress in the X direction, an expansive stress in the Z direction, and a shear stress in the XZ-plane. The expander coefficients $d_{21}$ and $d_{23}$ have been reported to have comparatively high values and to be of the same sign, while the coefficient $d_{25}$ relating shear in the XZ-plane to an electrical field parallel to the Y-axis is said to be rather small. According to the prior art, a rectangular Y-cut plate for utilizing the expander piezoelectric effect should be oriented in the XZ-plane with its longer sides parallel to either the X- or Z-axis, preferably the former, or at an angle up to about 15° from such axis. It follows from the values and signs of the published coefficients that a Y-cut plate of ethylenediamine tartrate having its edges approximately parallel to the X and Z directions would exhibit little useful piezoelectric face-shear effect. It also follows from these coefficients that a Y-cut plate with edges at substantial angles to the X and Z directions would show an even smaller shear piezoelectric effect, while the expansion effects would remain substantial practically independently of the orientation of the plate in the XZ-plane.

It has now been discovered, however, that a plate of ethylenediamine tartrate having a major face lying in or near the XZ-plane is subject to vigorous piezoelectric excitation of the face-shear modes of motion when the sides of the plate are properly oriented. This property of such Y-cut plates is associated with values of the piezoelectric coefficients $d_{21}$ and $d_{23}$ which not only are high in magnitude but also are opposite in sign rather than of the same sign, and with a coefficient $d_{25}$ having a value about three times as large as previously was believed to be the case. The approximate values as now determined for the coefficients $d_{21}$ and $d_{23}$ are respectively $+11.3 \times 10^{-12}$ and $-12.3 \times 10^{-12}$ meters per volt, and for the coefficient $d_{25}$, $18.4 \times 10^{-12}$ meters per volt.

It is an object of the invention, therefore, to provide a new and improved piezoelectric crystal plate which substantially avoids one or more of the limitations of prior piezoelectric plates.

It is another object of the invention to provide a piezoelectric crystal plate of ethylenediamine tartrate having a crystallographic orientation affording a new and improved piezoelectric operation.

It is a further object of the invention to provide a new and improved piezoelectric crystal plate capable of withstanding relatively high temperatures and exhibiting suitably high values of electrical resistivity.

In accordance with the invention, a piezoelectric crystal plate of ethylenediamine tartrate has a pair of electrodable surfaces with the normal to the plane of each of these surfaces inclined not more than 15° from the Y-axis of the crystalline ethylenediamine tartrate substance. The plate additionally has a generally quadrilateral outline, and has the projection of each of two sides of the quadrilateral on the XZ-plane individually forming an angle with the X-axis of the plate substantially equal to one of the complementary angles +64° and −26°.

For a better understanding of the present invention, together with other and further objects thereof, reference is had to the following description taken in connection with the accompanying drawing, and its scope will be pointed out in the appended claims.

Figure 2:
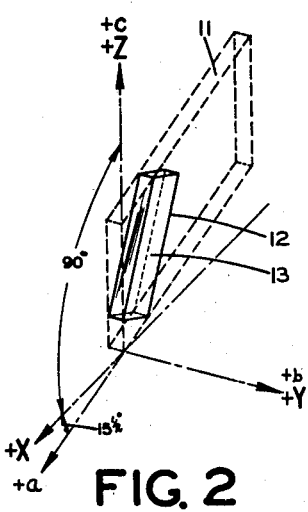
Figure 3:
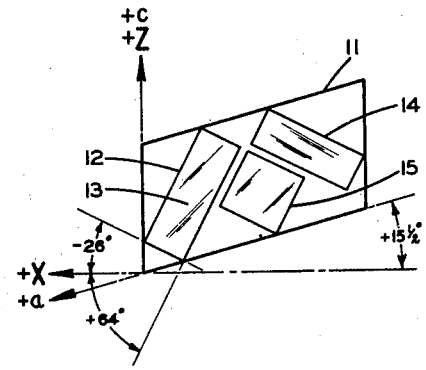
Figure 4:
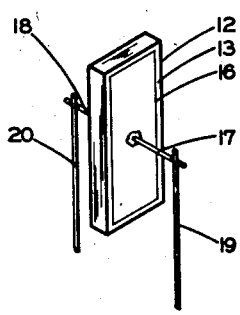

In the drawing, Fig. 1 is a perspective view of a typical crystal of ethylenediamine tartrate of the usual right-handed variety; Fig. 2 is a view in similar perspective of a thin section cut from the crystal of Fig. 1; Fig. 3 is a plan view of the section shown in Fig. 2; and Fig. 4 is a perspective view of an electroded piezoelectric plate prepared from the thin section shown in Figs. 2 and 3.

Referring to Fig. 1, the ethylenediamine tartrate crystal is represented with relation to its crystallographic axes $a$, $b$, and $c$ and the related set of coordinate axes X, Y, and Z. The crystallographic index of each of the major crystalline faces exposed to view in Fig. 1 is designated in the conventional manner. The positive directions of the crystallographic and coordinate axes are represented by arrows. The faces and edges of a thin section 11 are indicated in the view of Fig. 1. The section 11 is chosen with each of its two major faces in an XZ-plane, so that the direction normal to these surfaces coincides with the Y-axis.

Fig. 2 shows in dashed lines in the same perspective as in Fig. 1 the section 11 cut from the crystal of Fig. 1, and also shows in solid lines a piezoelectric crystal plate 12 cut from the element 11. The plate 12 of ethylenediamine tartrate has a pair of opposed electrodable surfaces, of which the front surface 13 is visible in the drawing, with the normal to the plane of each of these surfaces inclined not more than 15° from the Y-axis of the crystalline substance. More specifically, these electrodable major surfaces, as shown, are substantially parallel to each other, and the normal to the plane of each of them substantially coincides with the Y-axis.

The orientation of the sides of the plate 12 in the section 11 is evident from the plan view of Fig. 3, in which the positive direction of the $b$- and Y-axes is normal to the plane of the drawing and toward the observer. In Fig. 3 the $a$-axis is seen to be at an angle of about +15.5° from the X-axis. The plate 12 has a generally quadrilateral outline, in this case a substantially rectangular elongated outline. The surface 13 thus forms a quadrilateral, and the projection of each of two sides of this quadrilateral on the XZ plane individually forms an angle, with the X-axis of the substance making up the plate, substantially equal to one of the complementary angles +64° and −26°. The surface 13 of quadrilateral outline, as shown, actually lies in the XZ plane and so is identical with a projection of the surface on that plane. The surface forming the quadrilateral in this case is a rectangle, and each pair of opposed sides of the rectangle individually forms an angle with the X-axis equal to one of the complementary angles +64° and −26°. The angle for the pair of longer sides of the rectangular surface 13 is +64°. It follows that the angle for the pair of shorter sides is −26°.

Also illustrated in Fig. 3 are two additional plates not shown in Fig. 2. Each of these plates has sides oriented to form an angle with the X-axis equal to one of the complementary angles +64° and −26°. One of these plates, designated 14, is an elongated rectangular plate having its length and width directions parallel respectively to the width and length directions of the plate 12. The other plate shown is a square plate 15, the sides of which are oriented parallel to the sides of the plates 12 and 14.

For use in piezoelectric apparatus, the crystal plate 12 may be provided with electrodes on its two major faces, as illustrated in Fig. 4. There is shown an electrode 16 on one major face, while a similar electrode, not shown, is provided on the opposite major face. It may be convenient to provide lead wires 17 and 18 each of which is fastened at one end to the opposite major faces of plate 12. Thus the wire 17 may be fastened to one of the major surfaces 13 by a conductive cement, after which the electrode 16 may be applied to that surface. In accordance with one suitable method, evaporated gold is condensed on the surface of the plate to form the electrode 16 in electrical contact with the lead wire 17. Although the electrode 16 is shown with margins near the edges, it frequently is desirable to provide an electrode extending to the edges of the electroded surface without any margins. The opposite surface is provided similarly with an electrode in contact with the lead wire 18. The wires 17 and 18 in some applications may serve as support members for the plate, in which case additional wires 19 and 20 may be spot-welded to the respective wires 17 and 18 and fastened to a base, not shown, of insulating material.

Piezoelectric face-shear plates such as those illustrated in Figs. 3 and 4 may be utilized in electro-mechanical transducers, electrical filter networks, and oscillatory circuits. Piezoelectric crystal apparatus in which Y-cut plates of this type are so used are described and claimed in the co-pending application entitled "Piezoelectric crystal apparatus," Ser. No. 23,905, filed April 29, 1948 in the name of Hans Jaffe and assigned to the same assignee as the present invention. When used in filter networks or for the control of frequency, it is found that ethylenediamine tartrate crystal plates oriented in accordance with the invention exhibit a remarkably low variation of resonant frequency of the face-shear mode of motion with change in temperature. Since the piezoelectric coefficients $d_{21}$ and $d_{23}$ are not only of nearly equal magnitudes but also of opposite sign, a suitably oriented rectangular Y-cut plate, which has been found to be a plate having its sides at angles of +64° and −26° to the X-axis, is a face-shear plate exhibiting a maximum amount of shear in the plane of the plate but no substantial expansive change in length of the major edges of the plate. For a Y-cut plate with the aforesaid orientation of its sides in the XZ-plane the shear piezoelectric coefficient, designated $d'_{25}$, has the unusually high value of about $30.0 \times 10^{-12}$ meters per volt. Such a plate also has an advantageously high piezoelectric coupling coefficient of about 0.28 for face-shear motion.

It is important to note that the orientation of the sides of the plate with respect to the X-axis may be varied several degrees in either the positive or negative direction from the exact orientation for the maximum face-shear piezoelectric effect without causing a perceptible decrease in the face-shear effect. The direct piezoelectric excitation of the lateral expander modes is quite small in plates oriented to obtain the maximum face-shear effect, since for this orientation the two expander coefficients $d'_{21}$ and $d'_{23}$ become equal in magnitude and sign while their algebraic sum has the same value as the algebraic sum of $d_{21}$ and $d_{23}$, given hereinabove, which sum is very small. A plate having its sides rotated up to several degrees from the orientation of maximum face-shear effect is not subject to any greatly increased direct piezoelectric excitation of the lateral expander modes, and such excitation of one of the expander modes may in fact decrease for such a rotation of the plate. Thus a rectangular face-shear crystal plate may be used effectively in piezoelectric apparatus when the projections of each pair of opposed sides of the rectangular outline of the plate onto the XZ-plane individually form angles with the X-axis of the plate either exactly equal to or substantially equal to one of the complementary angles $+64°$ and $-26°$, the phrase "substantially equal to" connoting a tolerance of plus or minus several degrees.

Although the crystal plates illustrated in the drawing are quite thin relative to their length and width dimensions and are of rectangular shape in outline, plates having other relative dimensions are permissible in accordance with the invention. Various quadrilateral outlines may be used, such as trapezoidal outlines, but with plates for use in frequency-selective circuits it is preferable to have at least one pair of opposite sides parallel, the distance between the two parallel sides of this pair determining the approximate resonant frequency of the plate.

The electroded plate of Fig. 4, having its length substantially in the $+64°$ direction and its width correspondingly in the $-26°$ direction relative to the X-axis, may be excited in conventional oscillator or filter circuits in the fundamental face-shear mode. Then the motion of the plate at the fundamental resonant frequency is established with reference to a central nodal line parallel to the longer edges, and the propagation of elastic waves in the plate is along its width direction. For an elongated plate such as the plate 12 having a length 2.5 times its width, the frequency constant for the fundamental face-shear mode has been determined to be 1120 (kilocycle/second)-millimeters at room temperature. Thus a plate $31.8 \times 12.57 \times 4.04$ mm. is found to have a fundamental face-shear resonant frequency of 89.4 kilocycles per second at room temperature. As the ratio of length to width is increased, the frequency constant decreases from 1120 and approaches 1055. This plate also exhibits a series of overtones of the width-controlled shear mode readily followed beyond the 99th harmonic. This series of overtones shows very little interference from the overtones of any expander modes, indicating a low elastic cross-coupling between the shear modes and expander modes.

The fundamental frequency constant for a crystal plate 12 having the particular dimensions mentioned above increases with rise in temperature and reaches a maximum at about 76° C. This temperature is more than 10° C. below a maximum safe operating temperature; ethylenediamine tartrate plates have been operated as resonators at 90° C., and the crystal material has been exposed to a temperature of 100° C. without damage. A deviation of temperature of 2.5° C. either upward or downward from 76° C. shifts the resonant frequency only about one part in 100,000, so that rough thermostatic control provides good frequency stability. The temperature of maximum frequency constant may be shifted by changing the ratio of width to length of the rectangular plate. Moreover, rectangular crystal plates having the general shape and orientation of plate 14 tend to exhibit maxima in the curves of frequency vs. temperature at considerable lower temperatures for the same ratio of width to length.

The temperature at which the frequency-temperature characteristic becomes flat also may be varied by rotating the plate somewhat out of the XZ-plane. For example, crystal plates such as the plates 12, 14, and 15 of Fig. 3 may be rotated up to as much as 15° about one of their major edges, preferably one of the longer major edges in the case of a rectangular plate 12 or 14, without material decrease in the excitation of the face-shear mode of motion. Thus, the characteristics of a Y-cut face-shear plate of ethylenediamine tartrate may be varied as desired by virtue of a choice of orientations involving inclination of the normal to the major surfaces of the plate of up to 15° with reference to the Y-axis, variation of the projection of a side of the plate on the XZ-plane of up to several degrees from the orientations illustrated in Fig. 3, and choice of shape varying for rectangular plates from the square outline of plate 15 to an outline so elongated in either direction as to approach an effectively infinite length. It is noted that the length of a rectangular bar of given width also may be varied to obtain a desired capacitance between the electrodes of a plate such as is illustrated in Fig. 4. The face-shear mode of motion ordinarily excited in such a rectangular plate has a resonance characteristic controlled primarily by the effective width dimension, so that the length does not greatly affect this characteristic.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A piezoelectric crystal plate of ethylenediamine tartrate having a pair of electrodable surfaces with the normal to the plane of each of said surfaces inclined not more than 15 degrees from the Y-axis of the crystalline substance, having a generally quadrilateral outline, and having the projection of each of two sides of the quadrilateral on the XZ-plane individually forming an angle with the X-axis of said plate substantially equal to one of the complementary angles $+64$ and $-26$ degrees.

2. A piezoelectric crystal plate of ethylenediamine tartrate having a pair of substantially parallel electrodable surfaces with the normal to the plane of each of said surfaces substantially coinciding with the Y-axis of the crystalline substance, having a generally quadrilateral outline, and having each of two sides of the quadrilateral individually forming an angle with the X-axis of said plate substantially equal to one of the complementary angles $+64$ and $-26$ degrees.

3. A piezoelectric crystal plate of ethylenediamine tartrate having a pair of electrodable surfaces with the normal to the plane of each of said surfaces inclined not more than 15 degrees from the Y-axis of the crystalline substance, having a substantially rectangular outline, and having the projection of each pair of opposed sides of the rectangle on the XZ-plane individually forming an angle with the X-axis of said plate substantially equal to one of the complementary angles +64 and −26 degrees.

HANS JAFFE.

REFERENCES CITED

The following references are of record in the file of this patent:

Mason, Proc. of I. R. E., vol. 35, pages 1005, 1012, October 1947. (Copy in 171–327–33a.)

Mason, Physical Review, vol. 70, Nos. 9 and 10, pages 705, 728 (see 708), Nov. 1 and 15, 1946. (Copy in Scientific Lib.)